US012562957B2

(12) United States Patent
Oedlund

(10) Patent No.: US 12,562,957 B2
(45) Date of Patent: *Feb. 24, 2026

(54) SELF-CONFIGURATION OF WIRELESS CONNECTIONS

(71) Applicant: Adeia Media Holdings LLC, San Jose, CA (US)

(72) Inventor: Anders Johan Oedlund, San Francisco, CA (US)

(73) Assignee: Adeia Media Holdings LLC, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/382,918

(22) Filed: Oct. 23, 2023

(65) Prior Publication Data

US 2024/0056352 A1 Feb. 15, 2024

Related U.S. Application Data

(63) Continuation of application No. 17/509,580, filed on Oct. 25, 2021, now Pat. No. 11,831,497, which is a (Continued)

(51) Int. Cl.
*H04L 41/0806* (2022.01)
*H04L 67/51* (2022.01)

(Continued)

(52) U.S. Cl.
CPC ......... *H04L 41/0806* (2013.01); *H04W 8/005* (2013.01); *H04W 48/16* (2013.01); *H04L 67/51* (2022.05)

(58) Field of Classification Search
CPC ............... H04L 12/165; H04L 12/2605; H04L 12/2656; H04L 12/5695; H04L 63/0426; H04L 63/06
See application file for complete search history.

(56) References Cited

U.S. PATENT DOCUMENTS

| | | | |
|---|---|---|---|
| 5,696,763 | A | 12/1997 | Gang |
| 6,961,559 | B1 | 11/2005 | Chow et al. |

(Continued)

FOREIGN PATENT DOCUMENTS

| | | |
|---|---|---|
| WO | 2017079087 A1 | 5/2017 |

OTHER PUBLICATIONS

U.S. Appl. No. 14/929,497, Advisory Action mailed Oct. 9, 2018, 4 pgs.

(Continued)

*Primary Examiner* — Oussama Roudani
(74) *Attorney, Agent, or Firm* — HG LAW LLP

(57) ABSTRACT

In general, certain embodiments of the present disclosure provide methods and/or systems for self-configuration of an electronic device to a wireless network is provided, which includes a wireless communication interface, one or more processors, memory, and one or more programs stored in the memory which comprise instructions for the wireless communication interface to send a plurality of multicast packets to a plurality of specific destination addresses. The plurality of multicast packets includes encoded messages in the plurality of specific destination addresses that allow a wireless connection device, with wireless capable hardware, to automatically configure itself to be able to access a wireless network. According to various embodiments, the wireless network may be a secure wireless network.

20 Claims, 7 Drawing Sheets

Related U.S. Application Data continuation of application No. 16/435,038, filed on Jun. 7, 2019, now Pat. No. 11,190,398, which is a continuation of application No. 14/929,497, filed on Nov. 2, 2015, now Pat. No. 10,355,923.

(51) Int. Cl.
*H04W 8/00* (2009.01)
*H04W 48/16* (2009.01)

(56) References Cited

U.S. PATENT DOCUMENTS

| | | | |
|---|---|---|---|
| 8,818,261 B1 * | 8/2014 | Chen | H04W 12/08 |
| | | | 455/11.1 |
| 9,137,103 B2 | 9/2015 | Moore | |
| 9,338,130 B2 | 5/2016 | Von Huben et al. | |
| 9,622,155 B2 | 4/2017 | Mccann et al. | |
| 9,998,326 B2 | 6/2018 | Thanos et al. | |
| 10,257,705 B2 * | 4/2019 | Bradley | H04L 41/0806 |
| 10,355,923 B2 | 7/2019 | Oedlund | |
| 11,190,398 B2 | 11/2021 | Oedlund | |
| 11,831,497 B2 | 11/2023 | Oedlund | |
| 2004/0240466 A1 | 12/2004 | Unitt et al. | |
| 2004/0260800 A1 | 12/2004 | Gu et al. | |
| 2005/0101318 A1 | 5/2005 | Williams et al. | |
| 2008/0168496 A1 | 7/2008 | Lee et al. | |
| 2010/0054154 A1 | 3/2010 | Lambert et al. | |
| 2011/0210816 A1 | 9/2011 | Wang | |
| 2011/0211693 A1 | 9/2011 | Carvalho et al. | |
| 2014/0006191 A1 | 1/2014 | Shankar et al. | |
| 2015/0052235 A1 | 2/2015 | Tokunaga | |
| 2015/0163703 A1 * | 6/2015 | Wu | H04W 48/08 |
| | | | 370/331 |
| 2015/0181505 A1 | 6/2015 | Deng et al. | |
| 2016/0087811 A1 | 3/2016 | Yin et al. | |
| 2016/0094956 A1 | 3/2016 | Sakai | |
| 2016/0127890 A1 | 5/2016 | Ql et al. | |
| 2016/0205588 A1 * | 7/2016 | Liu | H04L 69/22 |
| | | | 370/392 |
| 2017/0126491 A1 | 5/2017 | Oedlund | |
| 2018/0026733 A1 | 1/2018 | Yang et al. | |
| 2018/0109419 A1 * | 4/2018 | Schallich | H04L 65/1069 |
| 2019/0020537 A1 * | 1/2019 | Sharma | H04L 41/0806 |
| 2022/0038336 A1 | 2/2022 | Hebron et al. | |
| 2022/0060374 A1 | 2/2022 | Oedlund | |

OTHER PUBLICATIONS

U.S. Appl. No. 14/929,497, Examiner Interview Summary mailed Apr. 10, 2018, 3 pgs.
U.S. Appl. No. 14/929,497, Examiner Interview Summary mailed Nov. 20, 2018, 3 pgs.
U.S. Appl. No. 14/929,497, Final Office Action mailed Jul. 5, 2018, 23 pgs.
U.S. Appl. No. 14/929,497, Non-Final Office Action mailed Apr. 17, 2017, 26 pgs.
U.S. Appl. No. 14/929,497, Non-Final Office Action mailed Nov. 20, 2017, 25 pgs.
U.S. Appl. No. 14/929,497, Notice of Allowance mailed Mar. 22, 2019, 9 pgs.
International Application Serial No. PCT/US16/59743, International Preliminary Report on Patentability mailed May 17, 2018, 8 pages.
International Application Serial No. PCT/US16/59743, International Search Report and Written Opinion mailed Jan. 17, 2017, 9 pages.

* cited by examiner

IP Packet 320

322

| 326 Version | 328 IHL | 330 ToS | 332 Total Length | |
| 334 Identification | | | 336 Flags | 338 Fragment Offset |
| 340 TTL | | 342 Protocol | 344 Checksum | |
| 346 Source IP Address | | | | |
| 348 Destination IP Address | | | | |
| 350 Options | | | | |

324    (Encrypted Data)

23 lower bits mapped from IP address to MAC address

| 302 | 304 | 306 | 308 | 310 | 312 | 314 | 316 | 318 |
|-----|-----|-----|-----|-----|-----|-----|-----|-----|
| Frame Control | Duration ID | Address 1 | Address 2 | Address 3 | Seq. Control | Address 4 | Frame Body | FCS |

300

402

404

OUI Segment
406 x Segment
408 y Segment
410 z Segment
412

Type
414

Parity
416

Position
418

Value
420

239.17.1.97

01:00:5E:11:01:61

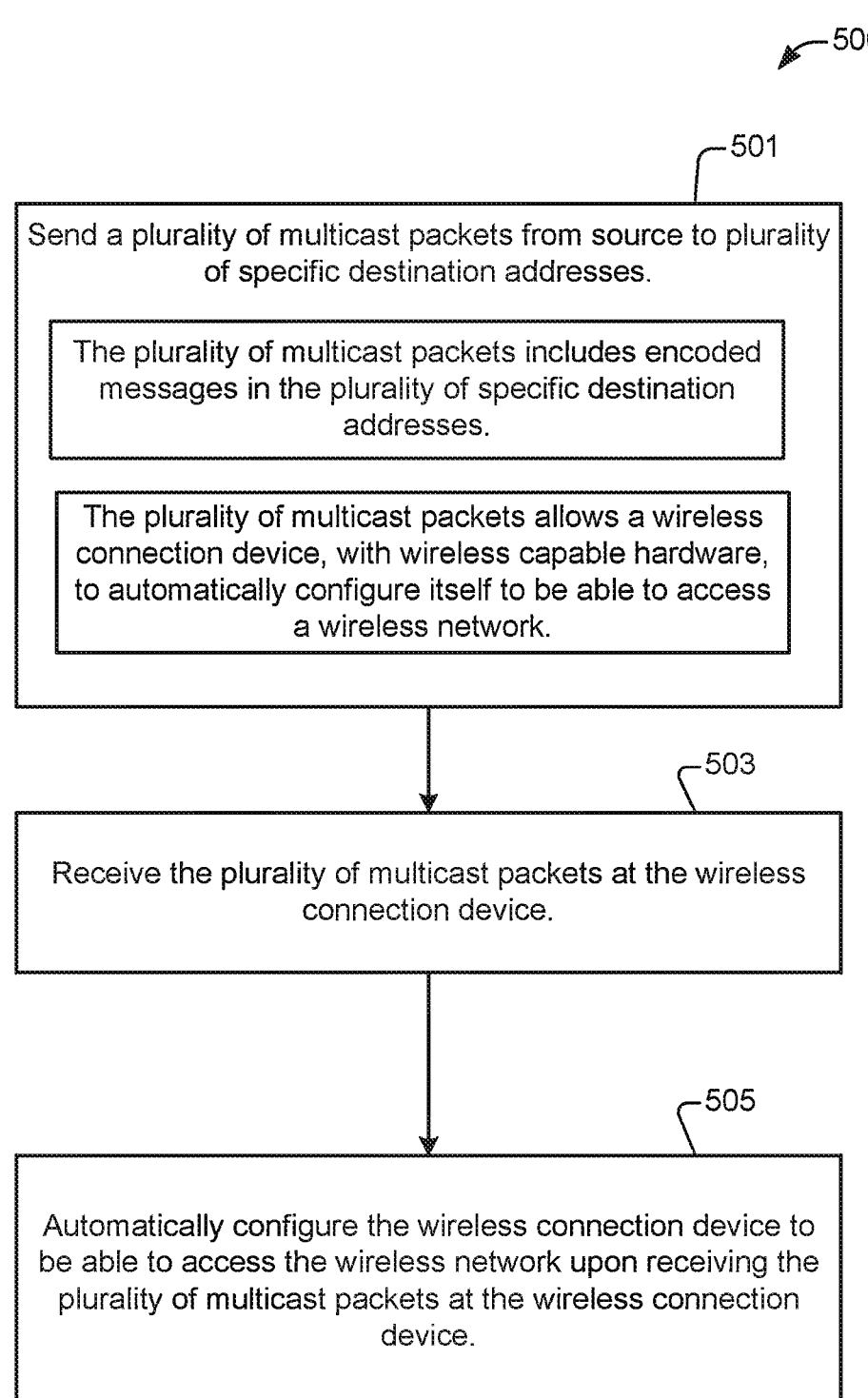

┌─ 500

┌─ 501

Send a plurality of multicast packets from source to plurality of specific destination addresses.

The plurality of multicast packets includes encoded messages in the plurality of specific destination addresses.

The plurality of multicast packets allows a wireless connection device, with wireless capable hardware, to automatically configure itself to be able to access a wireless network.

┌─ 503

Receive the plurality of multicast packets at the wireless connection device.

┌─ 505

Automatically configure the wireless connection device to be able to access the wireless network upon receiving the plurality of multicast packets at the wireless connection device.

*FIG. 5*

SELF-CONFIGURATION OF WIRELESS CONNECTIONS

CROSS-REFERENCE TO RELATED APPLICATIONS

This application is a continuation application of U.S. patent application Ser. No. 17/509,580, filed Oct. 25, 2021, which is a continuation application of U.S. patent application Ser. No. 16/435,038, filed Jun. 7, 2019, now U.S. Pat. No. 11,190,398, which is a continuation of Ser. No. 14/929, 497, filed Nov. 2, 2015, now U.S. Pat. No. 10,355,923, the disclosures of which are hereby incorporated by reference herein in their entireties.

TECHNICAL FIELD

The present disclosure relates generally to wireless networks, and more specifically to configuration of devices on wireless networks.

DESCRIPTION OF RELATED ART

Many computing systems and devices provide connectivity to wireless networks. One wireless network communication standard commonly implemented in computing systems and devices is known as Wireless Fidelity (Wi-Fi), which generally refers to a wireless local area network (WLAN) operating according to a standard from the IEEE 802.11 standards family Other wireless communication networks may include the use of wireless data communication means such as wireless USB, Bluetooth, cellular data, etc. These wireless networks may be secured or unsecured.

In order to connect to wireless networks, including Wi-Fi networks, conventional wireless devices may require the execution of multiple wireless connection steps. This typically requires a user to execute operations in response to the wireless connection steps. In general, the user must configure the wireless device by at least enabling the wireless device to search for and identify a wireless network, and execute a connection pairing procedure or a connection authentication procedure. Consequently, under conventional methods, a wireless device must include a relatively sophisticated input/output, or I/O, system which may include multiple other devices such as a mouse, keyboard, visual screen, and other user interfaces. Furthermore, configuration of a wireless device through executing multiple wireless connection steps can be complicated and time consuming, especially when many wireless devices need to be configured to connect to a network.

Thus, there is a need for a simplified method for configuring a wireless device for connectivity that utilizes a reduced user interface and fewer user operations.

SUMMARY

The following presents a simplified summary of the disclosure in order to provide a basic understanding of certain embodiments of the present disclosure. This summary is not an extensive overview of the disclosure and it does not identify key/critical elements of the present disclosure or delineate the scope of the present disclosure. Its sole purpose is to present some concepts disclosed herein in a simplified form as a prelude to the more detailed description that is presented later.

In general, certain embodiments of the present disclosure provide techniques or mechanisms for simplified or automatic configuration of a wireless device for connection to a wireless network. According to various embodiments, a system for self-configuration of an electronic wireless device to connect to a wireless network is provided. The system includes a wireless communication interface, one or more processors, memory, and one or more programs stored in the memory. The one or more programs comprises instructions for the wireless communication interface to send a plurality of multicast packets to a plurality of specific destination addresses. The plurality of multicast packets includes encoded messages in the plurality of specific destination addresses that allow a wireless connection device, with wireless capable hardware, to automatically configure itself to be able to access a wireless network. According to various embodiments, the wireless network may be a secure wireless network.

In yet another implementation, a wireless connection device includes hardware configured to allow the wireless connection device to communicate via a wireless network and to receive multicast packets. The wireless connection device further includes memory and a processor. In some embodiments, the processor is configured to receive a plurality of multicast packets sent to a plurality of specific destination addresses, and to automatically configure the wireless connection device to be able to access the wireless network upon receiving the plurality of multicast packets.

According to various embodiments, the wireless connection device may not have access to the wireless network before receiving the plurality of multicast packets. In other embodiments, the plurality of specific destination addresses may include MAC addresses reserved specifically for Ethernet multicast. In other embodiments, the plurality of multicast packets may include UDP packets sent to a wireless access point in the wireless network. In other embodiments, the wireless connection device may not be able to decrypt the encrypted portions of the plurality of multicast packets until after the wireless connection device is configured to access the wireless network. In still other embodiments, the wireless connection device may receive the plurality of multicast packets by monitoring for multicast packets while in an initial listening mode. In certain embodiments, while in the initial listening mode, the wireless connection device may scan a plurality of communication channels while actively looking for Ethernet packets being sent in at least one of the plurality of communication channels. In some embodiments, the plurality of multicast packets include information corresponding to a name of the wireless network and an encryption password of the wireless network encoded into the plurality of specific destination addresses. In certain embodiments, the wireless connection device may decode messages encoded in the plurality of multicast packets by extracting various fields from the specific destination addresses, including a "type" field, a "position" field, and a "value" field.

In yet another implementation, a method for self-configuration of a wireless connection device to a wireless network is provided. In some embodiments, the method includes sending, from a source, a plurality of multicast packets to a plurality of specific destination addresses, wherein the plurality of multicast packets includes encoded messages in the plurality of specific destination addresses that allow a wireless connection device, with wireless capable hardware, to automatically configure itself to be able to access the wireless network upon receiving the plurality of multicast packets. In some embodiments, the method also includes receiving, at the wireless connection device, the plurality of multicast packets at the wireless connection device. In other embodiments, the method further includes automatically configuring the wireless connection device to be able to access the wireless network upon receiving the plurality of multicast packets at the wireless connection device.

BRIEF DESCRIPTION OF THE DRAWINGS

The disclosure may best be understood by reference to the following description taken in conjunction with the accompanying drawings, which illustrate particular embodiments of the present disclosure.

FIG. 5 illustrates an example of a method for self-configuration of a wireless connection device to a wireless network in accordance with one or more embodiments.

DESCRIPTION OF PARTICULAR EMBODIMENTS

Figure 1:
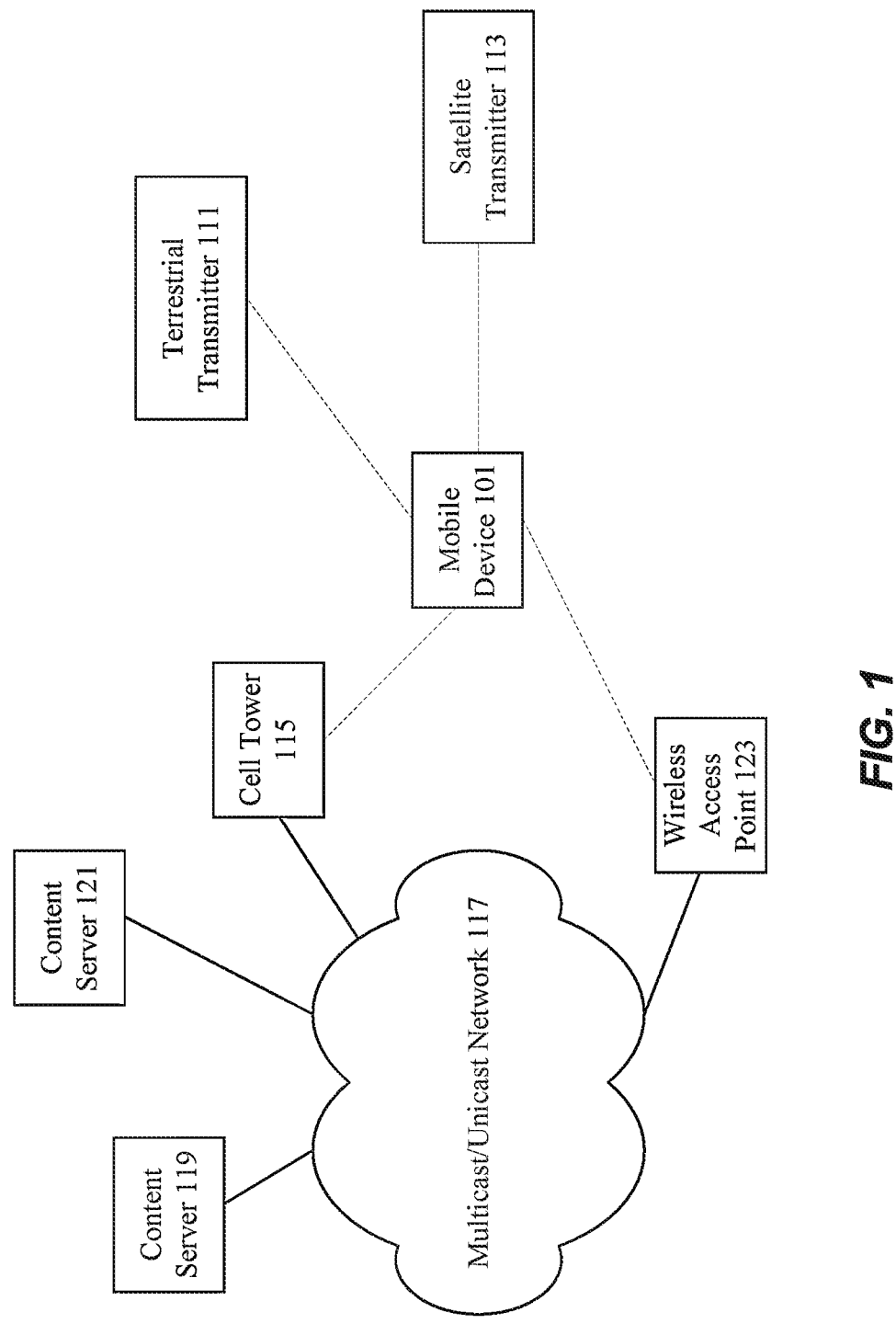
FIG. 1 illustrates one example of a broadcast and multicast/unicast system, in accordance with one or more embodiments.

Reference will now be made in detail to some specific examples of the present disclosure including the best modes contemplated by the inventors for carrying out the present disclosure. Examples of these specific embodiments are illustrated in the accompanying drawings. While the present disclosure is described in conjunction with these specific embodiments, it will be understood that it is not intended to limit the present disclosure to the described embodiments. On the contrary, it is intended to cover alternatives, modifications, and equivalents as may be included within the spirit and scope of the present disclosure as defined by the appended claims.

For example, the techniques of the present disclosure will be described in the context of particular protocols. However, it should be noted that the techniques of the present disclosure apply to variations of protocols. In the following description, numerous specific details are set forth in order to provide a thorough understanding of the present disclosure. Particular example embodiments of the present disclosure may be implemented without some or all of these specific details. In other instances, well known process operations have not been described in detail in order not to unnecessarily obscure the present disclosure.

Various techniques and mechanisms of the present disclosure will sometimes be described in singular form for clarity. However, it should be noted that some embodiments include multiple iterations of a technique or multiple instantiations of a mechanism unless noted otherwise. For example, a system uses a processor in a variety of contexts.

However, it will be appreciated that a system can use multiple processors while remaining within the scope of the present disclosure unless otherwise noted. Furthermore, the techniques and mechanisms of the present disclosure will sometimes describe a connection between two entities. It should be noted that a connection between two entities does not necessarily mean a direct, unimpeded connection, as a variety of other entities may reside between the two entities. For example, a processor may be connected to memory, but it will be appreciated that a variety of bridges and controllers may reside between the processor and memory. Consequently, a connection does not necessarily mean a direct, unimpeded connection unless otherwise noted.

Overview

According to various embodiments, a system for self-configuration of an electronic wireless device to connect to a wireless network is provided. The system includes a wireless communication interface, one or more processors, memory, and one or more programs stored in the memory which comprise instructions for the wireless communication interface to send a plurality of multicast packets to a plurality of specific destination addresses. The plurality of multicast packets includes encoded messages in the plurality of specific destination addresses that allow a wireless connection device, with wireless capable hardware, to automatically configure itself to be able to access a wireless network. According to various embodiments, the wireless network may be a secure wireless network.

EXAMPLE EMBODIMENTS

According to various embodiments, data may be transmitted over a wireless network that implements standards from the IEEE 802.11 standards family, such as Wi-Fi. Such data may be transmitted in the form of data packets corresponding to a seven-layer Open Systems Interconnection (OSI) model of computer networking and utilize standard protocols such as transmission control protocol (TCP) or user datagram protocol (UDP). A typical UDP data packet corresponding to an IEEE 802.11 wireless standard includes a media access control (MAC) sublayer of the data-link layer, organized as a MAC frame consisting of a MAC header, a frame body, and a frame check sequence (FCS) as further explained below in FIG. 3. In some embodiments, the destination IP address of a data packet may be mapped to the MAC header as a MAC address. In other embodiments, the MAC address may be mapped to the destination IP address of a data packet.

In some implementations, the wireless network is a secure wireless network. The data within the frame body of a data packet sent over a secure wireless network, called a payload, is encrypted and cannot be read by a wireless connection device that is not authorized to receive data packets on the secure wireless network. However, in some implementations, data packets may be sent via multicast format, such as IP multicast, application layer multicast, or multicast over other wireless networks or cable television. An example of an IP multicast technique may utilize one or more IP multicast group addresses as destination IP addresses that are stored in the MAC headers of the sent data packets. Such multicast data packets may be sent by a source device with a wireless communication interface, such as a server, a mobile device, or a wireless access point on the secure wireless network. In some embodiments, the destination IP addresses include MAC addresses reserved specifically for Ethernet multicast.

In some implementations, a wireless connection device may include hardware, such as a wireless interface, configured to scan for and receive multiple multicast data packets addressed to one or more IP multicast group addresses over a wireless network. In some embodiments, the wireless connection device may be set to an initial listening mode to actively search for wireless communications being sent on various communication channels. For example, 2.4 GHz Wi-Fi has 14 channels for communication, 11 of which are approved for use. When in listening mode, the wireless connection device spends a certain amount of time, such as 1 second, on each channel to detect for transmission. Once a transmission is detected on a particular channel, the wireless communication device may stay tuned to the particular channel to receive the sent multicast data packets.

In some embodiments, the wireless connection device may not have access to the secure wireless network before receiving the multicast data packets. In other embodiments, the wireless connection device may not be authorized to access the secure wireless network and thus, cannot decrypt encrypted portions of the multicast data packets. However, the unauthorized wireless connection device may still receive and read the MAC addresses of multicast data packets sent over a secure wireless network. In some embodiments, a source device may send out multiple multicast data packets to multiple specific destination IP addresses such that a message may be encoded in the multiple specific destination addresses. According to various embodiments, each MAC address of a multicast data packet may encode one or more message characters which comprise a part of a message comprising one or more message characters. In some embodiments the encoded message may consist of information required to connect to a secure wireless network, such as the service set identifier (SSID) or passphrase of the secure wireless network.

According to various embodiments, the wireless connection device may include memory and a processor that is configured to decode MAC addresses of received multicast data packets by interpreting the MAC addresses and extracting fields/values from each MAC address including a type-field, parity-field, position-field, and a value-field. In some embodiments, the value-field corresponds to a message character or instruction, which may be converted based on the American Standard Code for Information Interchange (ASCII) character encoding scheme. For example a value of "61" in the value-field of a MAC address would correspond to the letter "a" in an ASCII scheme. In some embodiments, the value of the type-field indicates whether the converted message character corresponds to the SSID name or the passphrase of the secure wireless network. In some embodiments, the type-field may indicate that the message character or instruction corresponds to metadata. The value of the position-field indicates the order in which to place the converted message character. In some embodiments, the value of the parity-field identifies whether the particular MAC address is correct or corresponds to the other MAC addresses being decoded. In some embodiments, the processor of the wireless connection device can use the interpretation of the MAC address to automatically configure the wireless connection device to access the secure wireless network.

In some embodiments, the encoded message character may indicate the length of the message, or the number of message characters within the particular message type. In other embodiments, the encoded message may include a cyclic redundancy check (CRC) to provide a checksum validation to ensure that no errors were made in the conversion and ordering of the values of the decoded MAC addresses. In some embodiments, the wireless connection device may continue to scan and receive multicast data packets until all message characters for each particular message is received. In some embodiments, the source device cycles sending of the multicast data packets until all multicast data packets have been confirmed to be received by the wireless connection device. For example, the source device may continuously send the multicast data packets at the rate of 1 packet every 5 milliseconds until the source device times out at a predetermined duration. In other embodiments, the source device may send a simple service discovery protocol (SSDP) to continuously scan for the presence of wireless connection devices. In some embodiments, the SSDP may include a 4-digit SSDP code to terminate the sending of multicast packets. Once a wireless connection device has been configured to the secure wireless network, it can read the SSDP code and reply to the source device with the code to signal to the sender to terminate the sending of the multicast data packets.

According to various embodiments, techniques and mechanisms are described herein with respect to configuration of devices to access a secure wireless network. However, the techniques and mechanisms described are applicable to configuration of devices to access any wireless network. Furthermore, the techniques and mechanisms described are also applicable to a wide variety of other contexts. For instance, the techniques and mechanisms described herein are applicable to any area in which it is desired to transmit any data or message to a device with reduced user input or without any user input.

FIG. 1 illustrates an example of a broadcast and multicast/unicast system that can be used in conjunction with the various techniques and embodiments of the present disclosure. According to various embodiments, a mobile device 101 includes multiple receivers for receiving both broadcast and multicast/unicast data. According to various embodiments, the mobile device 101 has a broadcast antenna such as a digital television (DTV) antenna for receiving over the air broadcast data and a cellular radio antenna for receiving cellular multicast/unicast data. In particular embodiments, broadcast signals are transmitted from a terrestrial transmitter 111 and/or from a satellite transmitter 113. Terrestrial transmitter 111 and satellite transmitter 113 provide broad coverage and high quality media streams where signals can be received. However, terrestrial and satellite transmitters may suffer from effects such as signal attenuation, interference, etc., from foliage, structures, weather, etc. Consequently, the techniques of the present disclosure supplement broadcast signals with multicast/unicast data such as data from IP networks delivered over cellular, mobile, WiFi, etc.

A device 101 connected to a multicast/unicast network 117 through a cell tower may enhance user experience. Cell towers 115 may provide coverage different than the coverage provided by terrestrial transmitter 111 and satellite transmitter 113. Cell signals also suffer from deleterious effects such as foliage, structures, etc., but may provide coverage different than that afforded by terrestrial and satellite transmitters because of different transmission sites, power levels, transmission frequencies, etc. However, bandwidth over cellular networks may be limited and/or costly, particularly for unicast transmission, and consequently it may be desirable to use broadcast networks when possible.

A multicast/unicast network 117 provides limited range and restricts mobility, but provide bandwidth and coverage in many indoor areas and supplement broadcast communications. A multicast/unicast network 117 may include streaming content servers 119 and 121 as well as wireless access points 123 for the mobile device 101. According to various embodiments, broadcast signals are used when available. If media quality from a broadcast signal degrades to a particular transition threshold, a device switches to a multicast/unicast network provided over a mobile or wireless local network. According to various embodiments, a device periodically checks media quality from a broadcast signal and switches from a multicast/unicast signal to a broadcast signal if the broadcast signal reaches a transition threshold and a corresponding channel is available.

Figure 2:
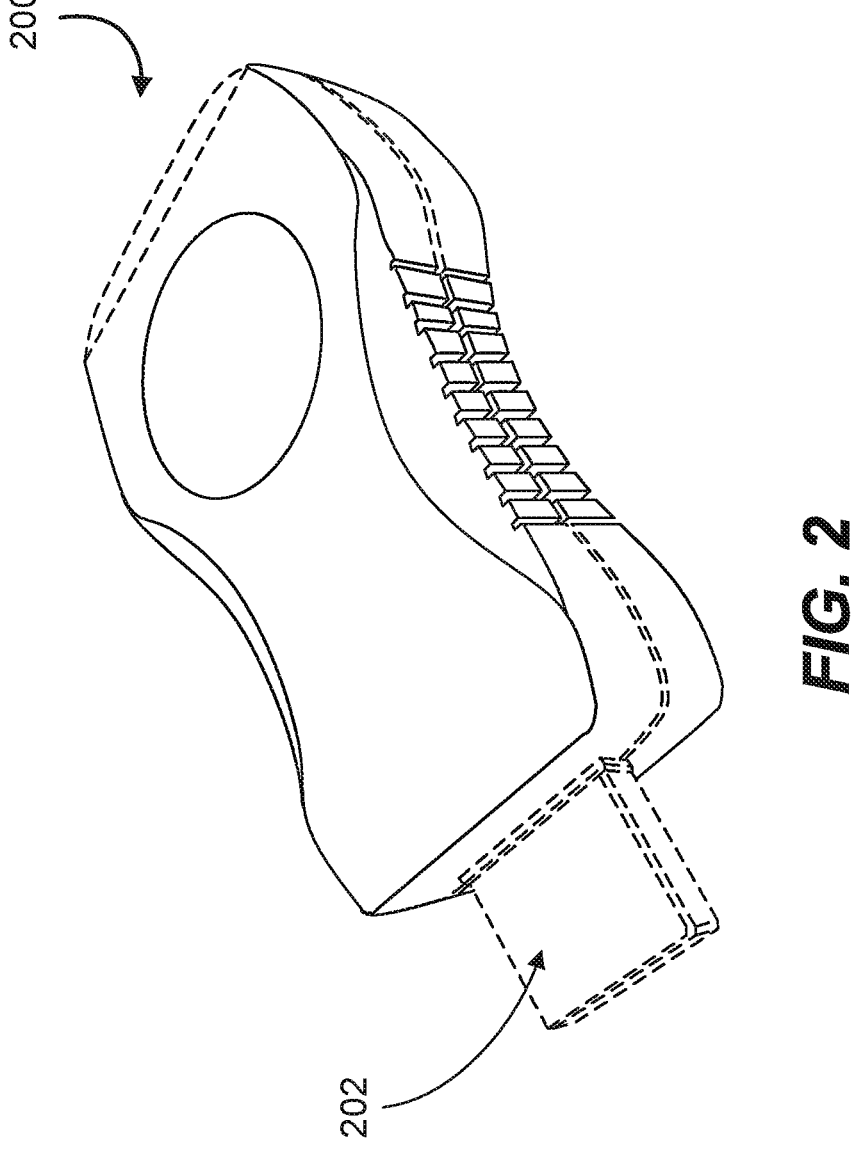
FIG. 2 illustrates a particular example of a wireless connection device in accordance with one or more embodiments.

FIG. 2 is an illustration of an example of a wireless connection device that may be used in conjunction with the methods and systems of the present disclosure, in accordance with one or more embodiments. In some embodiments, wireless connection device 200 may be a dongle that includes USB connector 202 to connect to a power source and/or transfer data. However, other power adapter means and data transfer mechanisms may be implemented. In some embodiments, wireless connector device 200 includes hardware configured, such as a wireless interface, to allow wireless communication over wireless network such as Wi-Fi, mobile, cellular, etc. Such hardware may additionally allow wireless connection device 200 to receive multicast data packets sent over a wireless network. In some embodiments, wireless connection device 200 may further include memory to store software, data, and other instructions. In some embodiment, wireless connection device 200 may further include one or more processors configured to receive multicast data packets sent to various destination IP addresses. The one or more processors may also be configured to automatically configure wireless connection device 200 to access a secure wireless network by methods further described in the present disclosure.

In various embodiments, wireless connection device 200 may also include a means to set wireless connection device 200 to a listening mode which activates the aforementioned hardware and processor to scan for and receive multicast data packets. In some embodiments, the wireless connection device may scan multiple communication channels while in the listening mode to look for Ethernet packets being sent by such communication channels. For example, the wireless connection device may spend a certain amount of time, such as 1 second, on each channel to detect transmissions. Once a transmission is detected on a particular channel, the wireless communication device may stay tuned to the particular channel to receive the multicast data packets. In some embodiments, the wireless connection device may continuously cycle through all possible communication channels.

Figure 3:
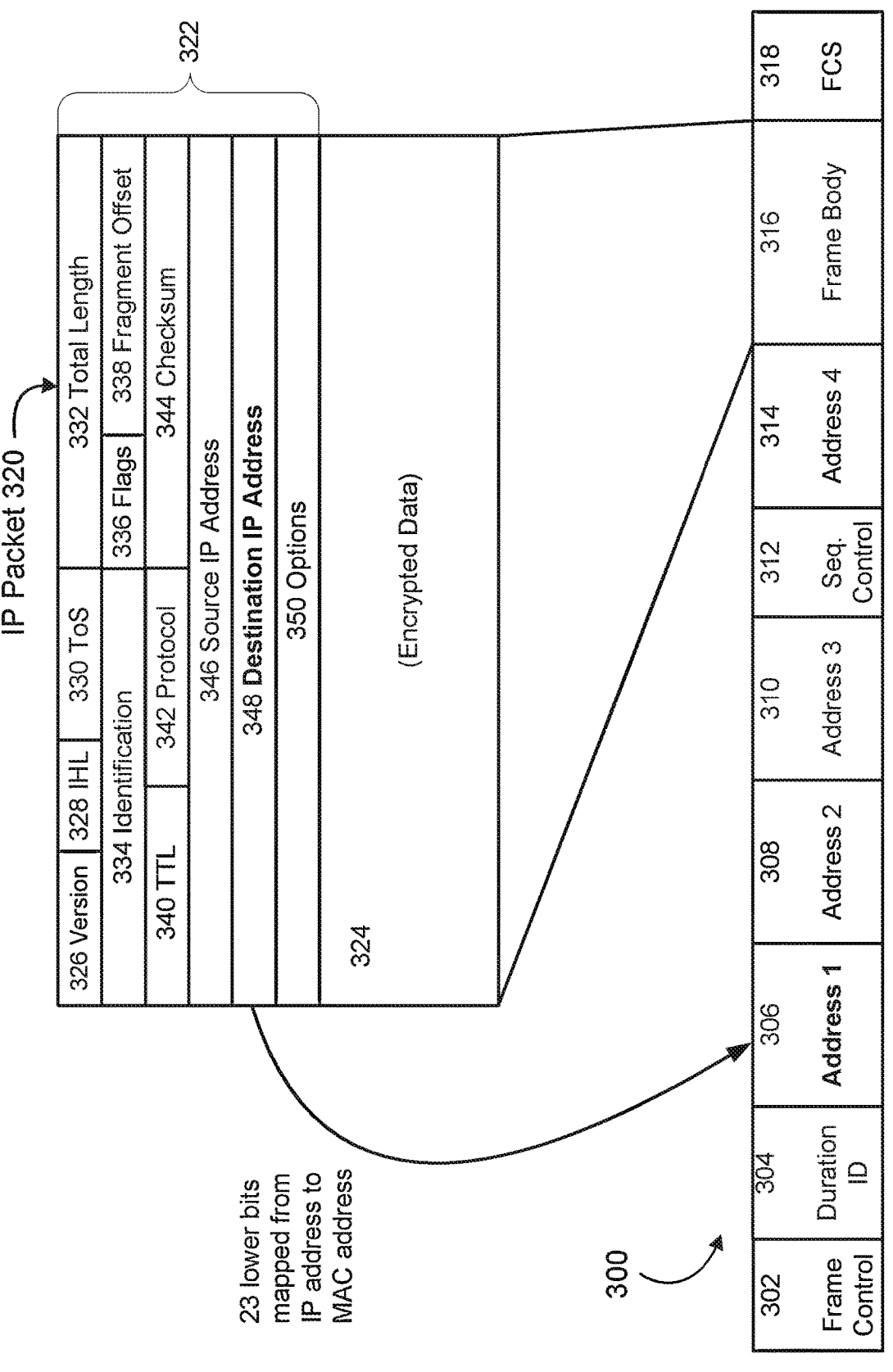
FIG. 3 illustrates an embodiment of a wireless packet header that can be used in conjunction with the techniques and mechanisms of the present disclosure in accordance with one or more embodiments.

FIG. 3 is an illustration of an embodiment of a typical IEEE 802.11 MAC frame 300 for a multicast data packet, in accordance with one or more embodiments. Such multicast data packet may be transmitted by wireless access point 123, shown in FIG. 1. MAC frame 300 includes the following fields: frame control 302, duration/ID 304, sequence control 312, frame body 316, frame check sequence 318, and MAC addresses 306, 308, 310, and 314. Frame body 316 contains data and/or information organized as IP packet 320. IP packet 320 includes IP header 322 and variable-length data field 324. IP header 322 consists of several fields including version 326, internet header length (IHL) 328, type of service (ToS) 330, total length 332, identification 334, flags 336, fragment offset 338, time to live (TTL) 340, protocol 342, checksum 344, source IP address 346, destination IP address 348, and options 350. The data and/or information in data field 324, also known as the "payload," is encrypted. In certain embodiments, the data and/or information in data field 324 may be unencrypted. In certain embodiments, IP packet 320 may not include one or more of the fields shown in FIG. 3, or may include one or more additional fields.

In some embodiments, destination IP address 348 may be a standard 32-bit address utilized in Internet Protocol version 4 (IPv4), and an address designated as Class D, which are reserved for multicast services. The lower 23 bits of destination IP address 348 are directly mapped to MAC address 306 in a hexadecimal base 16 format. In other embodiments, the destination IP address 348 may be directly mapped to any of the other MAC addresses in the MAC header, including 308, 310, and/or 314. In some embodiments, a destination MAC address 306, 308, 310, or 314 is mapped to the destination IP address 348. In an embodiment, message characters may be encoded in the values of MAC address field 306 of multiple multicast packets. In an embodiment, wireless connection device 200, shown in FIG. 2, may receive multiple multicast packets and decode the message characters located in the values of MAC address field 306 of each packet to decode a message, as further explained in FIG. 4 below. In some embodiments, the wireless connection device 200 may decode message characters directly from the destination IP address 348.

Figure 4:
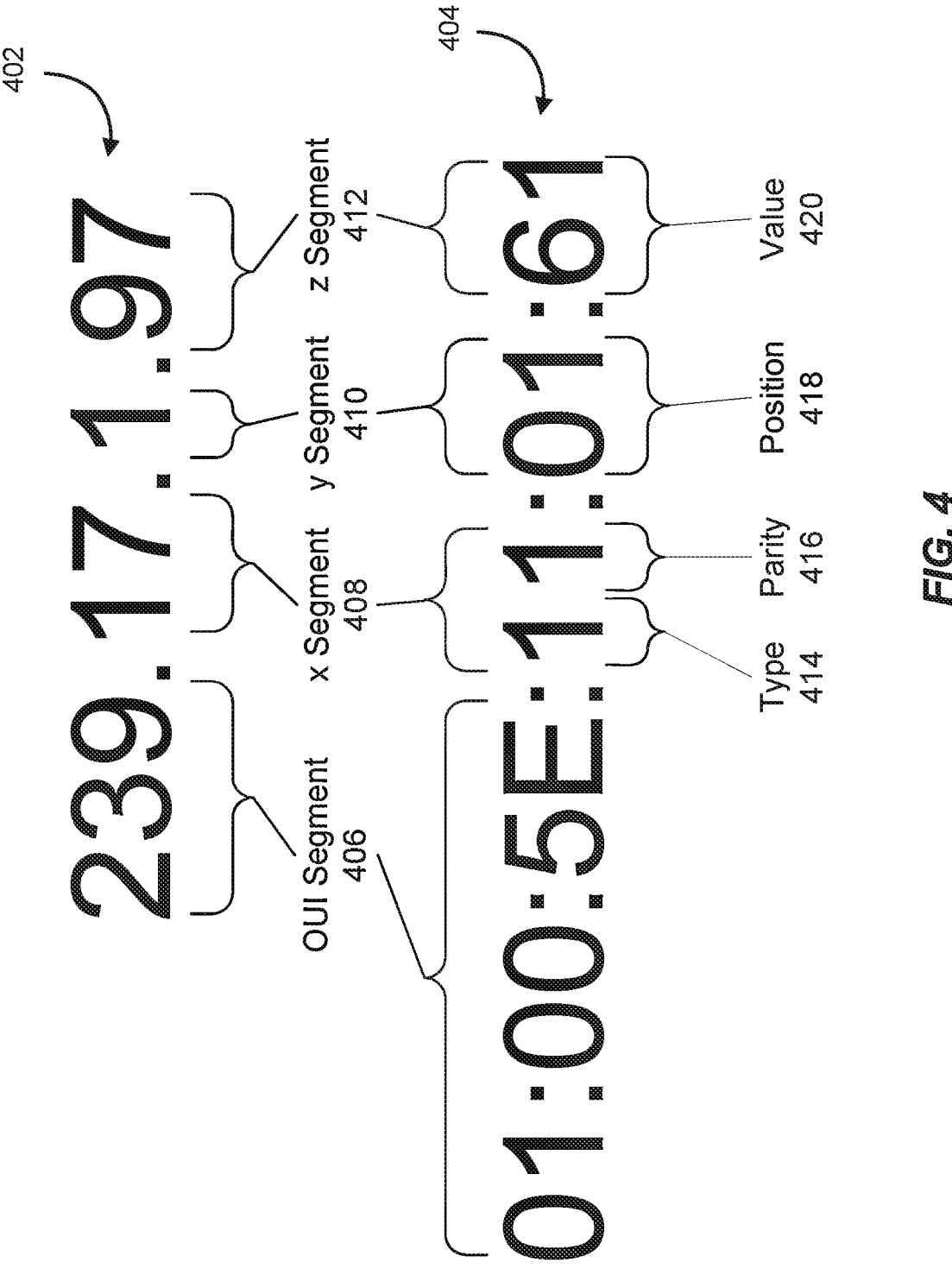
FIG. 4 illustrates an example of a destination IP address and corresponding MAC address, in accordance with one or more embodiments.

FIG. 4 illustrates an example of a destination IP address and corresponding MAC address, in accordance with one or more embodiments. Destination IP address 402 is an example of a destination IP address 348, shown in FIG. 3. MAC address 404 is an example of a MAC address 306, shown in FIG. 3. Both destination IP address 402 and MAC address 404 can be organized into the following segments: organizationally unique identifier (OUI) segment 406, x-segment 408, y-segment 410, and z-segment 412. According to the example of FIG. 4, the values of destination IP address 402 are represented in base 10 decimal format as 237.17.1.97. In this example, the value of 239 of the OUI segment 406 in the destination IP address 402 represents an OUI of a Class D 32-bit multicast address. In some embodiments, the OUI segment of the destination IP address 348 may consist of an organization-local scope address, a site-local scoped address, and/or a globally-scoped address as defined by RFC2365. The destination IP address 402 may be translated and mapped as a MAC address 404 as 01:00:5E:11.01.61. The value of 01:00:5E of the OUI segment 406 of MAC address 404 is the OUI assigned by the Internet Assigned Number Authority (IANA) for mapping multicast addresses to IEEE 802 addresses. The values of the x-, y-, and z-segments of MAC address 404 are represented as two digit, hexadecimal (base 16) translations of the values of the x-, y-, and z-segments of destination IP address 402. In other embodiments, the values of the x-, y-, and z-segments of destination IP address 402 are represented as the base 10 translations of the values of the x-, y-, and z-segments of MAC address 404.

According to various embodiments, each MAC address of a multicast packet encodes a message character comprising a part of a total message encoded within one or more multicast packets. In an embodiment, the z-segment 412 of MAC address 404 represents the value-field 420 of the encoded message. The value in value-field 420 is converted to a message character based on the American Standard Code for Information Interchange (ASCII) character encoding scheme. The value-field 420 of MAC address 404 is "61" which converts to the letter "a" in the ASCII scheme. In various embodiments, other conversion schemes may be implemented to convert the value of value-field 420 to a message character and/or other data.

In an embodiment, the first digit of x-segment 408 of MAC address 404 represents the type-field 414 of the encoded message character. For example, a type 1 indicates that the message character corresponds to the service set identifier (SSID) of the wireless network. A type 2 indicates that the message character corresponds to the passphrase for the wireless network. A type 4 indicates that the message character corresponds to metadata. In some embodiments, such metadata may include a 4-digit simpler service discovery protocol (SSDP) code to terminate of the sending of multicast packets. In other embodiments, the metadata may include a customer trial ID for software update requests, or any other external data. In other embodiments, different values may be used to indicate different message types for value of position-field 418 of MAC address 404 is "01," which indicates that the message character encoded by MAC address 404 is to be ordered in position 01. As the wireless connection device 200 receives other multicast packets, it will be able to order the decoded message characters based on the position-field 418 of MAC address of each multicast packet. In some embodiments, the ordering of message characters may be based on numerical, alphabetical, or any other ordering hierarchy.

Thus, the message character encoded by 01:00:5E: 11.01.61 value of MAC address 404 is the letter "a" that is located in position 01 of the SSID of the wireless network. In another example, the SSID of a wireless network designated "Network Name" may be transmitted by multicast packets with the following MAC addresses:

| IP Address | MAC Address | Type | Parity | Position | Value | Message |
|---|---|---|---|---|---|---|
| 239.17.0.14 | 01:00:5E:11:00:0e | 1 | 1 | 00 | 0e | Length: 14 characters |
| 239.23.1.78 | 01:00:5E:17:01:4e | 1 | 7 | 01 | 4e | "N" |
| 239.20.2.101 | 01:00:5E:14:02:65 | 1 | 4 | 02 | 65 | "e" |
| 239.19.3.116 | 01:00:5E:13:03:74 | 1 | 3 | 03 | 74 | "t" |
| 239.23.4.119 | 01:00:5E:17:04:77 | 1 | 7 | 04 | 77 | "w" |
| 239.16.5.111 | 01:00:5E:10:05:6f | 1 | 0 | 05 | 6f | "o" |
| 239.19.6.114 | 01:00:5E:13:06:72 | 1 | 3 | 06 | 72 | "r" |
| 239.21.7.107 | 01:00:5E:15:07:6b | 1 | 5 | 07 | 6b | "k" |
| 239.22.8.32 | 01:00:5E:16:08:20 | 1 | 6 | 08 | 20 | " " (space) |
| 239.19.9.78 | 01:00:5E:13:09:4e | 1 | 3 | 09 | 4e | "N" |
| 239.17.10.97 | 01:00:5E:11:0a:61 | 1 | 1 | 0a | 61 | "a" |
| 239.21.11.109 | 01:00:5E:15:0b:6d | 1 | 5 | 0b | 6d | "m" |
| 239.16.12.101 | 01:00:5E:10:0c:65 | 1 | 0 | 0c | 65 | "e" |
| 239.22.13.35 | 01:00:5E:16:0d:23 | 1 | 6 | 0d | 23 | CRC-8 | type-field 414. Other embodiments may include a type 3 for the type-field of a message character. However, utilizing a type 3 is not ideal because of its binary representation. In the example of FIG. 4, the type-field 414 of MAC address 404 indicates that the encoded message character is a type 1 corresponding to the SSID of a wireless network.

In an embodiment, the second digit of x-segment 408 of MAC address 404 represents the parity-field 416 of the encoded message character. In accordance with some embodiments, the value in parity-field 416 is a parity function of the values of the y-segment 410 and z-segment 412 of MAC address 404, and must correspond to those values. The parity function provides a check, and where the value in parity-field 416 does not correspond to a given function, the multicast packet is discarded and/or ignored. In other embodiments, the value in parity-field 416 may be a parity function of other values within the destination IP address 402 or MAC address 404.

In an embodiment, the y-segment 410 of MAC address 404 represents the position-field 418 of the encoded message. The value of position-field 418 indicates the order in which wireless connection device 200 is to place the encoded message character. In the example of FIG. 4, the In the above example, all MAC addresses are designated type 1 indicating that the message characters correspond to the SSID of the wireless network. The final message at position 0d is a cyclic redundancy check (CRC). The CRC in the above example is a CRC-8 that provides a checksum validation to ensure that no errors were made in the conversion and ordering of the values of the decoded MAC addresses. Where the checksum detects an error, the wireless connection device 200 continues to receive multicast packets. In some embodiments, the multicast packets are cycled by the source device in a self-configuration wireless connection system at the rate of one packet every 5 milliseconds. In some embodiments, multicast packets may be cycled until the source device times out at a predetermined duration. In other embodiments, multicast packets are cycled until the wireless connection device 200 sends an SSDP code to terminate of the sending of multicast packets. In other embodiments, CRCs of other polynomial lengths may be used. In other embodiments, different error checking mechanisms may be used. Additionally, the value of the first ordered message in the above example at position 00 indicates the length of the entire message, inclusive of the 00 position and the checksum at the final position.

As another example, the passphrase "Hello World!" of a wireless network may be transmitted by multicast packets with the following MAC addresses:

| IP Address | MAC Address | Type | Parity | Position | Value | Message |
|---|---|---|---|---|---|---|
| 239.0.0.72 | 01:00:5E:00:00:48 | 0 | 0 | 00 | 48 | "H" |
| 239.0.1.101 | 01:00:5E:00:01:65 | 0 | 0 | 01 | 65 | "e" |
| 239.0.2.108 | 01:00:5E:00:02:6c | 0 | 0 | 02 | 6c | "l" |

-continued

| IP Address | MAC Address | Type | Parity | Position | Value | Message |
|---|---|---|---|---|---|---|
| 239.0.3.108 | 01:00:5E:00:03:6c | 0 | 0 | 03 | 6c | "l" |
| 239.0.4.111 | 01:00:5E:00:04:6f | 0 | 0 | 04 | 6f | "o" |
| 239.0.6.32 | 01:00:5E:00:06:20 | 0 | 0 | 05 | 20 | " " (space) |
| 239.0.7.87 | 01:00:5E:00:07:57 | 0 | 0 | 06 | 57 | "W" |
| 239.0.8.111 | 01:00:5E:00:08:6f | 0 | 0 | 07 | 6f | "o" |
| 239.0.9.114 | 01:00:5E:00:09:72 | 0 | 0 | 08 | 72 | "r" |
| 239.0.10.108 | 01:00:5E:00:0a:6c | 0 | 0 | 09 | 6c | "l" |
| 239.0.11.100 | 01:00:5E:00:0b:64 | 0 | 0 | 0a | 64 | "d" |
| 239.0.12.33 | 01:00:5E:00:0c:21 | 0 | 0 | 0b | 21 | "!" |

In the above example, the message characters are designated as type 0, which may indicate here that the message characters correspond to a passphrase of a secure wireless network, in certain embodiments. The parity value of each MAC address is 0, but in other embodiments in accordance with the present disclosure, the parity value may be a function of one or more other values within that MAC address or corresponding destination IP address. In some embodiments, the size of destination IP address 448 may vary depending on the internet protocol version implemented. In other embodiments, destination IP address 448 may consists of an address in other designated classes of the IPv4.

FIG. 5 illustrates an example of a method 500 for self-configuration of a wireless connection device to access a wireless network, in accordance with one or more embodiments. At 501, a source device sends multicast data packets over a wireless network to a plurality of specific destination addresses. In some embodiments, the source device may be a device with a wireless interface, such as a server. In other embodiments the source device may be a wireless access point on the wireless network such as wireless access point 123 shown in FIG. 1. In other embodiments, the source device may be a user device such as a mobile device 101 shown in FIG. 1. In some embodiments, the plurality of multicast data packets includes encoded messages in the plurality of specific destination addresses that allow a wireless connection device, with wireless capable hardware, to automatically configure itself to be able to access a wireless network upon receiving the plurality of multicast packets, as described in FIG. 4. In some embodiments, the plurality of specific destination addresses may be MAC addresses such as MAC address 306 in a UDP packet with a MAC frame 300.

At 503, a wireless connection device receives multicast data packets. In some embodiments, the wireless connection device may be initially set to a listening mode to actively monitor and search for wireless communications being transmitted on various communications channels. For example, 2.4 GHz Wi-Fi has 14 channels for communication, 11 of which are currently approved for use in North America. When in listening mode, the wireless connection device spends a certain amount of time, one second for example, on each channel to detect transmissions of Ethernet packets. Once a transmission is detected on a particular channel, the wireless communication device may stay tuned to the particular channel to receive the multicast data packets. In some embodiments, the wireless connection device may also be constantly scanning for wireless access points. In certain embodiments, the wireless connection device 200 may continue scanning for multicast data packets indefinitely. In other embodiments, the wireless connection device

200 may stop scanning once it has received sufficient multicast data packets to decode a message as described in FIG. 4 above.

At 505, the wireless connection device configures its software to access a wireless network. In some embodiments, the memory of wireless connection device 200 may include program instructions to decode information required to identify and access a secure wireless network that is contained in the multicast data packets received by the wireless connection device. In some embodiments, the information is located in the MAC address of a MAC frame of a UDP packet, such as MAC address field 306 in MAC frame 300 shown in FIG. 3. In some embodiments, the wireless connection device may decode the information located in the MAC address by converting the values of the MAC address to message characters based on the ASCII character encoding scheme, as described above in FIG. 4.

Figure 6:
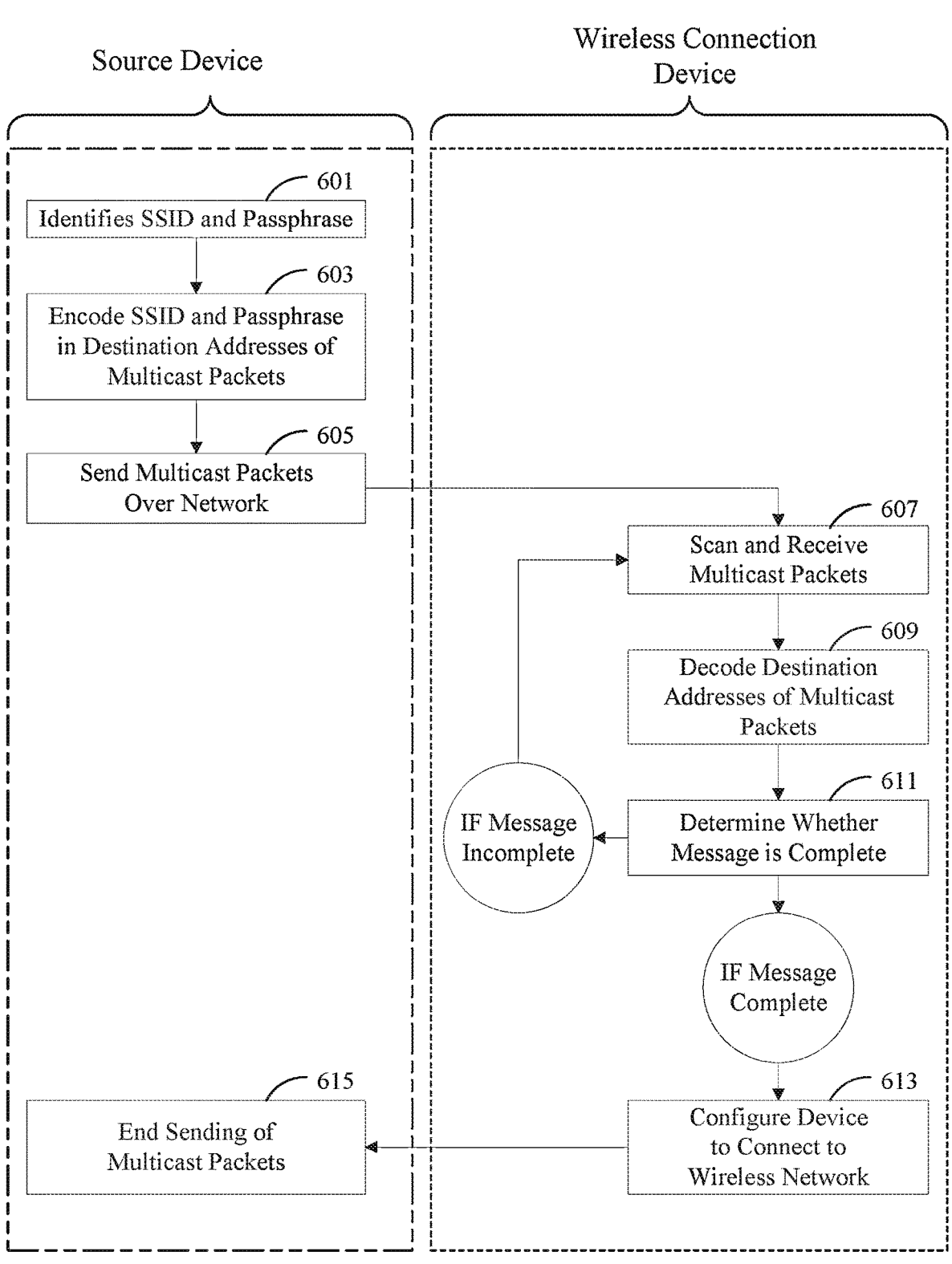
FIG. 6 illustrates an example of a method for self-configuration of a wireless connection device to a secure wireless network in accordance with one or more embodiments.

FIG. 6 illustrates another example of a method 600 for self-configuration of a wireless connection device to access a secure wireless network, in accordance with one or more embodiments. At 601, a source device identifies a wireless network name, or SSID, and an encryption password or passphrase required to identify and access a secure wireless network. In some embodiments, the source device may include a wireless communication interface. For example, the source device may be a user device, such as mobile device 101 as shown in FIG. 1. In other embodiments, the source may be a server, such as content server 119 or 121 as shown in FIG. 1. In still other embodiments, the source may be a wireless router or some other wireless access point, such as wireless access point 123 as shown in FIG. 1. In some embodiments, the source may be connected to the secure wireless network. In other embodiments, the source may be connected to other wireless networks that may be secure or unsecure. In some embodiments, the source already contains the information needed to configure the wireless connection device and does not require input by a user or any human action.

At 603, the source encodes information required for a wireless connection device to access a secure wireless network into the destination address multicast data packets at the source. In some embodiments, the required information may consist of the network SSID and passphrase. In other embodiments, other information or messages may be encoded into the destination addresses. In some embodiments, software on the source provides instructions to encode the SSID and passphrase values into the destination addresses of multicast UDP data packets, but other suitable datagram protocols may be utilized. In some embodiments, the information may be encoded in the MAC address of a MAC frame of a UDP packet, such as MAC address field 306 in MAC frame 300 shown in FIG. 3. In other embodiments, the information may be encoded in the destination IP address 348 of an IP packet 320 in MAC frame 300 shown in FIG. 3. In some embodiments, the SSID and passphrase information may be encoded in the MAC address by converting each message character of the SSID and passphrase information to MAC address numerals based on the ASCII character encoding scheme, as described above in FIG. 4. In various embodiments, other encoding schemes may be implemented to convert the message character to a value in the destination addresses.

At 605, the source causes the encoded multicast packets to be sent over a wireless network. In some embodiments, the multicast data packets may be sent by the source device. For example, the multicast data packets may be sent by a wireless access point on the secure wireless network. In some embodiments, the encoded multicast packets may be sent over a secure wireless network identified by the encoded information. In other embodiments, the encoded multicast packets may be sent over a separate wireless network that may be secure or unsecure. In some embodiments, the multicast data packets are continuously cycled. In some embodiments, the continuous cycling of multicast data packets may time out and stop after a predetermined period. For example the multicast data packets may be continuously sent at a rate of 1 packet every 5 milliseconds for 90 seconds.

At 607, the wireless connection device scans for and receives multicast data packets. In some embodiments, the wireless connection device may be a wireless connection device 200 as shown in FIG. 2. In some embodiments, the wireless connection device is initially set to a listening mode to actively search for wireless communications being transmitted on a plurality of communication channels. For example, 2.4 GHz Wi-Fi has 14 channels for communication, 11 of which are currently approved for use in North America. When in listening mode, the wireless connection device may spend a certain amount of time, one second for example, on each channel to detect transmissions. Once a transmission is detected on a particular channel, the wireless communication device may stay tuned to the particular channel to receive the multicast data packets.

At 609, the wireless connection device decodes the message characters contained in the plurality of multicast data packets to receive the SSID and passphrase information. In some embodiments, the wireless connection device may include software containing instructions to decode the information located in the MAC address by converting the values of the MAC address to message characters based on the ASCII character encoding scheme, as described above in FIG. 4. As previously mentioned, in various other embodiments, other information or data may be encoded within the destination addresses according to other encoding schemes.

At 611, the wireless connection device determines whether all message characters have been received and that the message is complete. In some embodiments, the wireless connection device may do so by implementing a checksum protocol to determine that it has correctly decoded the message characters located in the values of the destination addresses of the multicast data packets. In certain embodiments, the encoded multicast data packets may include a CRC-8 checksum validation to ensure that no errors were made in the conversion and ordering of the values of the decoded MAC addresses as described in FIG. 4. In some embodiments, if the wireless connection device determines that there has been an error or an incomplete message, the wireless connection device may continue to scan for and receive multicast data packets and repeat steps 607, 609, and 611 until it is determined that the message is complete.

If the wireless connection device determines that the encoded message is completely received, the wireless connection device automatically configures itself to access the secure wireless network at 613. In some embodiments, the wireless connection device includes a processor and memory with instructions to utilize the decoded message and/or information to configure itself to gain access to the secure wireless network and receive encrypted data.

At 615, the sending of multicast data packets by the source device is terminated once the wireless connection device is authorized to access the secure wireless network. In some embodiments, the multicast by the source device may only be terminated after the wireless connection device has successfully been configured and authorized to access the secure wireless network. For example, in various embodiments, the source device may multicast a simple service discovery protocol (SSDP) to continuously scan for the presence of wireless connection devices on the wireless network. In some embodiments, the SSDP may include a 4-digit SSDP code in the encrypted payload to terminate the sending of multicast packets at the source device. Only once a wireless connection device has been configured to connect to the secure wireless network, the wireless connection device can then receive the SSDP code and reply with a pingback signal to the source device to terminate sending of the multicast data packets. In other embodiments, other mechanisms may be implemented to terminate the sending of multicast data packets at the source device.

Figure 7:
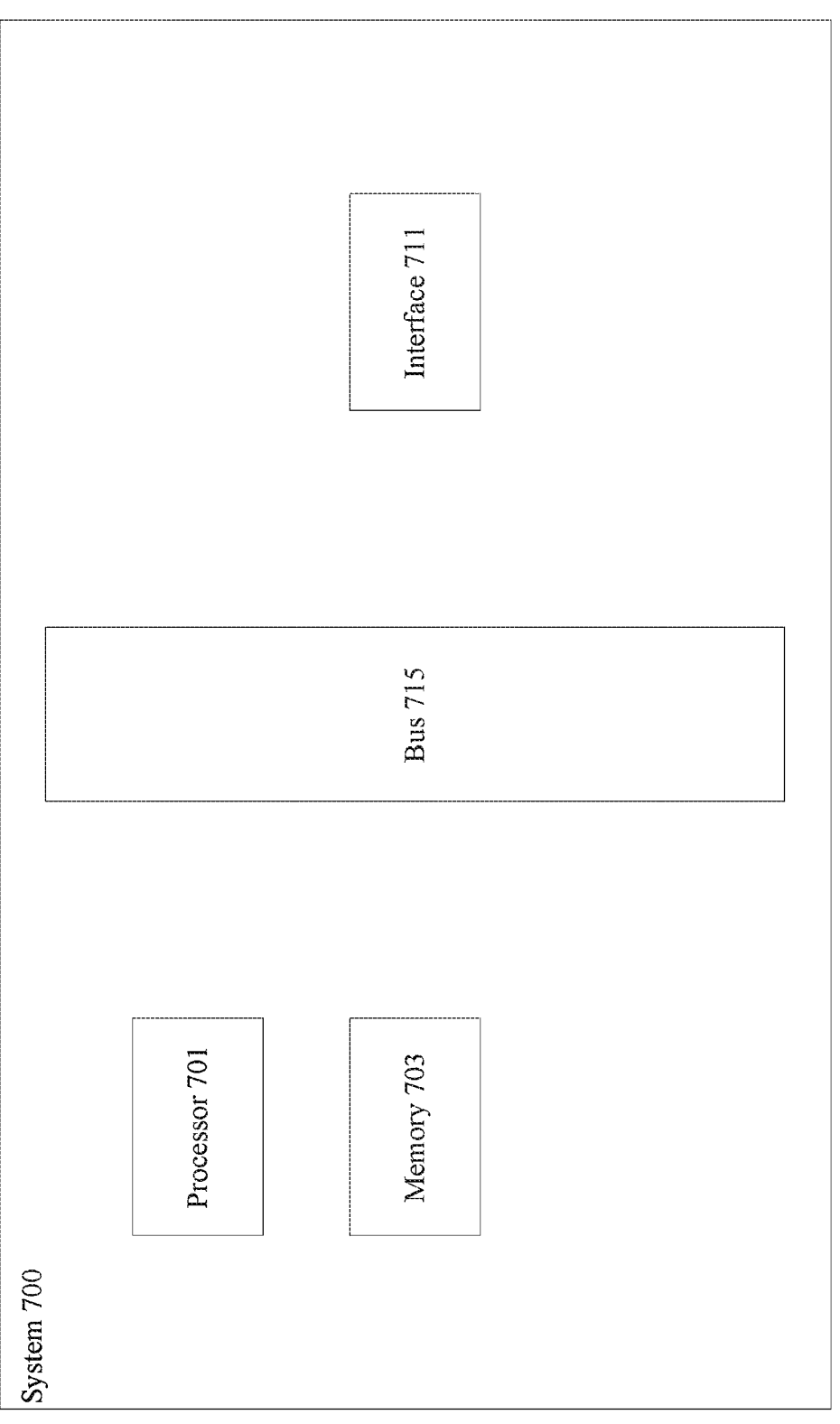
FIG. 7 illustrates an example of a self-configuration wireless connection system, in accordance with one or more embodiments.

FIG. 7 illustrates one example of a self-configuration wireless connection system, in accordance with one or more embodiments. According to particular embodiments, a system 700, suitable for implementing particular embodiments of the present disclosure, includes a processor 701, a memory 703, an interface 711, and a bus 715 (e.g., a PCI bus or other interconnection fabric) and operates as a streaming server. In some embodiments, when acting under the control of appropriate software or firmware, the processor 701 is responsible for modifying and transmitting data packets to a wireless connection device, such as wireless connection device 200 shown in FIG. 2. In other embodiments, the processor is responsible for receiving data packets sent by a source device and decoding the MAC addresses of such data packets as described in FIG. 4. Various specially configured devices can also be used in place of a processor 701 or in addition to processor 701. The interface 711 is typically configured to send and receive data packets or data segments over a network.

Particular examples of interfaces supports include Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management.

According to various embodiments, the system 700 is a server that also includes a transceiver, streaming buffers, and memory. The server may also be associated with configuration management, logging and report generation, and monitoring capabilities. In particular embodiments, functionality for allowing operation with mobile devices such as cellular phones operating in a particular cellular network and providing subscription management. According to various embodiments, an authentication module verifies the identity of devices including mobile devices. A logging and report generation module tracks mobile device requests and associated responses. A monitor system allows an administrator to view usage patterns and system availability. According to various embodiments, the fragment server handles requests and responses for media content related transactions while a separate streaming server provides the actual media streams.

Although a particular server is described, it should be recognized that a variety of alternative configurations are possible. For example, some modules such as a report and logging module and a monitor may not be needed on every server. Alternatively, the modules may be implemented on another device connected to the server. A variety of configurations are possible.

Because such information and program instructions may be employed to implement the systems/methods described herein, the present disclosure relates to tangible, or non-transitory, machine readable media that include program instructions, state information, etc. for performing various operations described herein. Examples of machine-readable media include hard disks, floppy disks, magnetic tape, optical media such as CD-ROM disks and DVDs; magneto-optical media such as optical disks, and hardware devices that are specially configured to store and perform program instructions, such as read-only memory devices (ROM) and programmable read-only memory devices (PROMs). Examples of program instructions include both machine code, such as produced by a compiler, and files containing higher level code that may be executed by the computer using an interpreter.

While the present disclosure has been particularly shown and described with reference to specific embodiments thereof, it will be understood by those skilled in the art that changes in the form and details of the disclosed embodiments may be made without departing from the spirit or scope of the present disclosure. It is therefore intended that the present disclosure be interpreted to include all variations and equivalents that fall within the true spirit and scope of the present disclosure. Although many of the components and processes are described above in the singular for convenience, it will be appreciated by one of skill in the art that multiple components and repeated processes can also be used to practice the techniques of the present disclosure.

What is claimed is:

1. A method comprising:
receiving a periodical transmission of a configuration communication, wherein the configuration communication comprises:
a plurality of packets, each respective packet of the plurality of packets comprising:
a type field in an address field of the respective packet, wherein the type field indicates whether a message character corresponds to a name of a network or a passphrase of the network; and
a value field in the address field of the respective packet, wherein the value field encodes a letter of the name of the network or the passphrase of the network; and
performing a self-configuration for connecting to the network, by reconstructing the name of the network or the passphrase from the value fields of the plurality of packets by:
recognizing the value fields corresponding to the name of the network or the passphrase based on the type fields of the plurality of packets; and ordering message characters for the name of the network or the passphrase from the value fields of the plurality of packets based on the recognizing the value fields corresponding to the name of the network or the passphrase based on the type fields of the plurality of packets.

2. The method of claim 1, wherein at least one of the plurality of packets is sent to a specific destination address.

3. The method of claim 2, wherein the specific destination address includes a media access control (MAC) address reserved specifically for Ethernet multicast.

4. The method of claim 1, wherein at least one packet of the plurality of packets includes a User Datagram Protocol (UDP) packet configured to be sent to a wireless access point of the network.

5. The method of claim 1, wherein a connection device is provided, and the connection device is configured to decrypt encrypted portions of at least one packet of the plurality of packets after the connection device is configured to access the network.

6. The method of claim 1, wherein a connection device is provided, and the connection device receives the plurality of packets by monitoring for group communication packets while in an initial listening mode, and wherein the connection device, while in the initial listening mode, scans a plurality of communication channels while actively monitoring for Ethernet packets being sent in at least one of a plurality of communication channels.

7. The method of claim 1, wherein each of the plurality of packets includes an encryption password of the network.

8. The method of claim 1, wherein a connection device is provided, and the connection device decodes messages encoded in the plurality of packets by extracting from at least one of the plurality of packets the type field, a position field, and the value field.

9. A method for transmitting, the method comprising:
periodically transmitting a configuration communication, wherein the configuration communication comprises:
a plurality of packets, each respective packet of the plurality of packets comprising:
a type field in an address field of the respective packet, wherein the type field indicates whether a message character corresponds to a name of a network or a passphrase of the network; and
a value field in the address field of the respective packet, wherein the value field encodes a letter of the name of the network or the passphrase of the network; and
causing a device to perform a self-configuration for connecting to the network, by reconstructing the name of the network or the passphrase from the value fields of the plurality of packets by:
recognizing the value fields corresponding to the name of the network or the passphrase based on the type fields of the plurality of packets; and
ordering message characters for the name of the network or the passphrase from the value fields of the plurality of packets based on the recognizing the value fields corresponding to the name of the network or the passphrase based on the type fields of the plurality of packets.

10. A system comprising:
a communication interface;
one or more processors;
memory; and
one or more programs stored in the memory, the one or more programs comprising instructions to:

receive a periodical transmission of a configuration communication, wherein the configuration communication comprises:

a plurality of packets, each respective packet of the plurality of packets comprising:

a type field in an address field of the respective packet, wherein the type field indicates whether a message character corresponds to a name of a network or a passphrase of the network; and a value field in the address field of the respective packet, wherein the value field encodes a letter of the name of the network or the passphrase of the network; and perform a self-configuration for connecting to the network, by reconstructing the name of the network or the passphrase from the value fields of the plurality of packets by:

recognizing the value fields corresponding to the name of the network or the passphrase based on the type fields of the plurality of packets; and ordering message characters for the name of the network or the passphrase from the value fields of the plurality of packets based on the recognizing the value fields corresponding to the name of the network or the passphrase based on the type fields of the plurality of packets.

11. The system of claim 10, wherein the letter is configured to convert to an American Standard Code for Information Interchange (ASCII) character, wherein the network is a secure wireless network, and wherein the name of the network or passphrase is a Service Set Identifier (SSID) name or passphrase.

12. The system of claim 10, wherein at least one of the plurality of packets is sent to a specific destination address.

13. The system of claim 12, wherein the specific destination address includes a media access control (MAC) address reserved specifically for Ethernet multicast.

14. The system of claim 10, wherein at least one packet of the plurality of packets comprises a User Datagram Protocol (UDP) packet configured to be sent to a wireless access point of the network.

15. The system of claim 10, further comprising a connection device and a group communication sending device, wherein the connection device is configured to decrypt encrypted portions of at least one packet of the plurality of packets after the connection device is communicatively coupled to the group communication sending device.

16. The system of claim 10, further comprising a connection device, wherein the connection device is configured to receive the plurality of packets by monitoring for group communication packets while in an initial listening mode, and wherein the connection device is configured to, while in the initial listening mode, scan a plurality of communication channels while actively monitoring for Ethernet packets being sent in at least one of the plurality of communication channels.

17. The system of claim 12, wherein an encryption password of the network is encoded into the specific destination address.

18. The system of claim 10, further comprising a connection device, wherein the connection device is configured to decode messages encoded in the plurality of packets by extracting from at least one packet of the plurality of packets the type field, a position field, and the value field.

19. The method of claim 1, wherein each respective packet of the plurality of packets further comprises a position field within each respective packet, wherein the position field indicates an order in which to place a character of the name of the network or the passphrase.

20. The system of claim 10, wherein each respective packet of the plurality of packets further comprises a position field within each respective packet, wherein the position field indicates an order in which to place a character of the name of the network or the passphrase.

* * * * *